United States Patent [19]
Matsui et al.

[11] Patent Number: 5,333,553
[45] Date of Patent: Aug. 2, 1994

[54] CARRIERS FOR LINEAR MOTOR VEHICLE-BORNE FIELD MAGNETS WHICH STRADDLE GROUND-SIDE COILS

[75] Inventors: Kazumi Matsui, Yokohama; Kouichi Matsuoka, Kokubunji; Shigeru Nakagawa, Tokyo, all of Japan

[73] Assignees: East Japan Railway Company; Railway Technical Research Institute; Magnetic Transportation System Engineering Company, all of Tokyo, Japan

[21] Appl. No.: 151,046

[22] Filed: Nov. 12, 1993

Related U.S. Application Data

[63] Continuation of Ser. No. 921,582, Jul. 30, 1992, abandoned.

[30] Foreign Application Priority Data

Sep. 9, 1991 [JP] Japan .................................. 3-229089

[51] Int. Cl.$^5$ .............................................. B60L 13/02
[52] U.S. Cl. ..................................... 104/290; 104/294
[58] Field of Search ................. 104/290, 291, 292, 294

[56] References Cited

U.S. PATENT DOCUMENTS

| | | | |
|---|---|---|---|
| 3,771,033 | 11/1973 | Matsui et al. ................... | 104/292 X |
| 3,792,665 | 2/1974 | Nelson ............................ | 104/292 |
| 4,151,447 | 4/1979 | von der Heide et al. ...... | 104/290 X |

FOREIGN PATENT DOCUMENTS 3724306  2/1988  Fed. Rep. of Germany ...... 104/290

OTHER PUBLICATIONS

"A Linear Synchronous Motor For Urban Transport Using Rare-Earth Magnets"; Slemon et al.; IEEE Transactions on Magnetics; vol. Mag-14, No. 5; Sep. 1988; pp. 921-924.

Primary Examiner—Robert J. Oberleitner
Assistant Examiner—S. Joseph Morano
Attorney, Agent, or Firm—Armstrong, Westerman, Hattori, McLeland & Naughton

[57] ABSTRACT

The carrier for linear motor vehicle-borne field magnets includes a aluminium profiled material of a gate shape in section, which is provided with recesses of permanent magnet size in both its legs. Permanent magnets attached to iron cores are inserted into the recesses in such a way that the N and S poles thereof are opposite to each other and alternate in the longitudinal direction of the carrier frame to form a spatial magnetic field by the alternation of the N and S poles between both the legs of the carrier frame, which interacts with the moving magnetic field created by ground-side coils to generate driving power. The carrier further includes support wheels, guide wheels and a vehicle support on which a vehicle is placed.

5 Claims, 3 Drawing Sheets

CARRIERS FOR LINEAR MOTOR VEHICLE-BORNE FIELD MAGNETS WHICH STRADDLE GROUND-SIDE COILS

This application is a continuation of application Ser. No. 07/921,582 filed Jul. 30, 1992, now abandoned.

BACKGROUND OF THE INVENTION

The present invention relates to a bogie or carrier for linear motor vehicle-borne field magnets.

In linear motor-driven railway systems, it has generally been proposed to locate a ground-side driving coil on the center of the track, provide guide plates on both sides of a frame for supporting the driving coil and mounting guide rollers on the linear motor vehicle, whereby driving power is guided along the guide plates.

According to one approach for running such a linear motor vehicle, two carriers are mounted on the front and rear part of one vehicle, as is the case with conventional railway trucks, and are then provided with guide wheels and magnets for generating vehicle-borne magnetic fields.

With field-generating magnets attached to the conventional railway trucks alone, it is impossible to obtain sufficient driving power, since they are designed to be mounted on only the front and rear parts of a vehicle. Much more magnets may be mounted on the truck, if its length is increased. However, this poses another problem that the truck is not only subject to considerable weight increases but becomes complicated in structure as well.

SUMMARY OF THE INVENTION

The present invention has been accomplished so as to provide a solution to the above problems.

An object of this invention is therefore to provide a carrier for linear motor vehicle-borne field magnets, which is simple in construction and light in weight and is tough enough.

According to the present invention, this object is achieved by the provision of a carrier for linear motor vehicle-borne field magnets including a carrier frame which straddles ground-side coils arranged along a track and permanent magnets along located along the track in such a way that their N and S poles are alternately opposite to each other with said ground-side coils positioned between them, thereby allowing currents flowing through said ground-side coils and said permanent magnets to interact to produce driving power, characterized in that said carrier frame is built up of an aluminium profiled material of a gate type in section and provided in both its legs with recesses at equal intervals, said recesses receiving permanent magnets attached to iron cores, so that spatial magnetic fields can be produced by the alternation of the N and S poles between both the legs of the aluminium profiled material of a gate shape in section.

Preferably, the permanent magnets attached to iron cores are grouped with an N and S pair as a unit, and adjacent iron cores are connected with each other in close contact relation.

Preferably, auxiliary iron cores, each of a gate shape in section, are mounted at both ends of the carrier in such a way that they straddle the carrier frame, and are provided with guide wheels on both its legs.

Preferably, iron reinforcements are mounted on the iron cores to which the permanent magnets are attached, and auxiliary iron cores, each of a gate shape in section, are mounted such that they straddle the reinforcements and are provided with support wheels.

Preferably, a plurality of carriers are each provided with a vehicle support on its longitudinally central portion, so that one vehicle can be supported by the vehicle supports of two adjacent carriers.

DESCRIPTION OF THE PREFERRED EMBODIMENT

Figure 1:
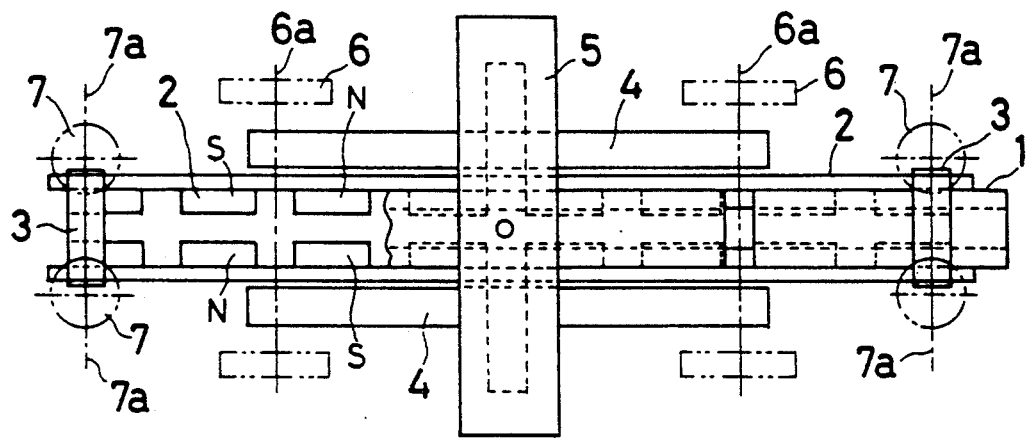
FIG. 1 is a plan view showing one embodiment of the carrier for linear motor vehicle-borne field magnets according to the invention.
Figure 2:
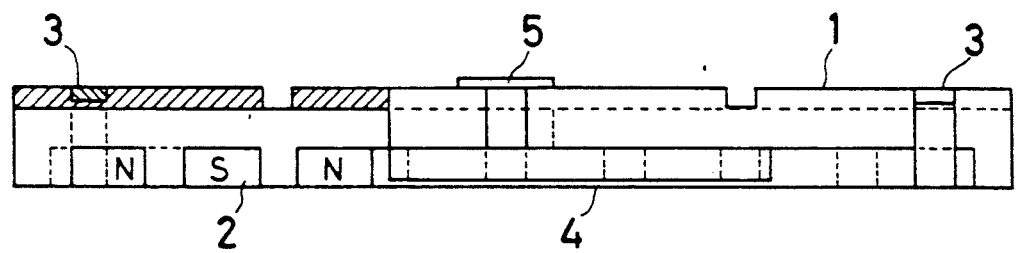
FIG. 2 is a side view of the carrier shown in FIG. 1.
Figure 3:
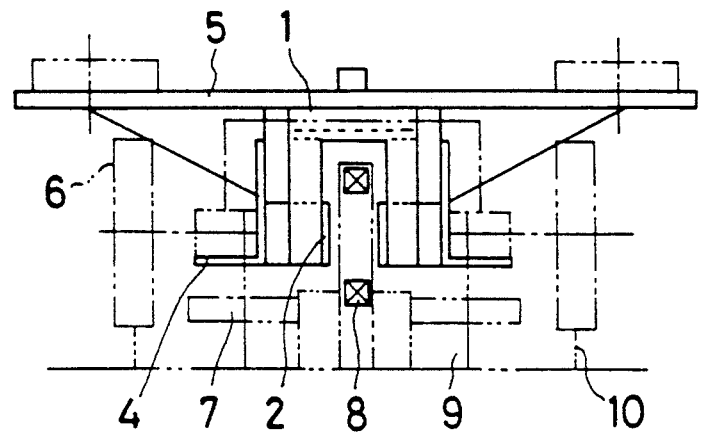
FIG. 3 is a front view of the carrier shown in FIG. 1.
Figure 4:
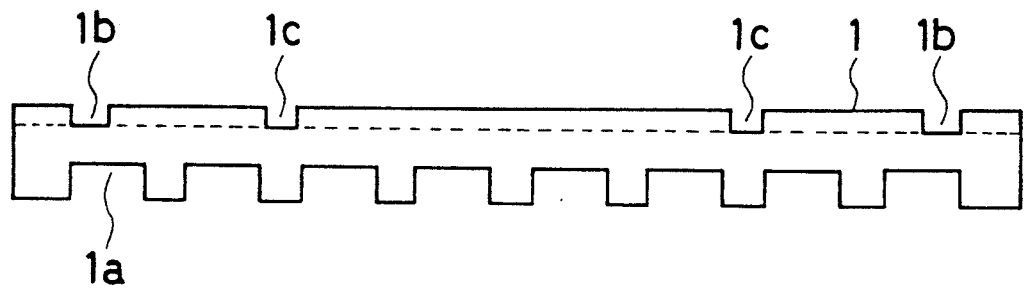
FIG. 4 is a side view of the carrier frame.
Figure 5:
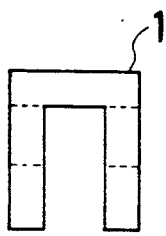
FIG. 5 is a front view of FIG. 4.
Figure 6:
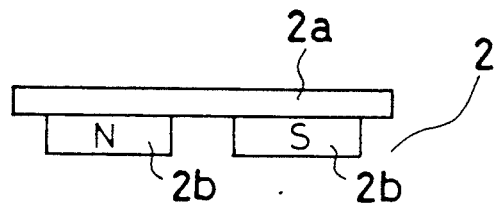
FIG. 6 is a plan view of a field magnet created by permanent magnets.
Figure 7:
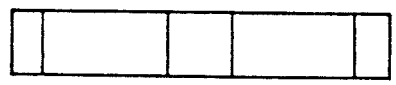
FIG. 7 is a side view of FIG. 6, and FIGS. 8($a$) and 8($b$) are views of the interconnection between the carriers.

FIG. 1 is a plan view showing one embodiment of the carrier for linear motor vehicle-borne field magnets according to the invention, FIG. 2 a side view of the carrier shown in FIG. 1, FIG. 3 a front view of the carrier shown in FIG. 1, FIG. 4 a side view of the carrier frame, FIG. 5 a front view of FIG. 4, FIG. 6 is a plan view of a field magnet created by permanent magnets, and FIG. 7 a side view of FIG. 6.

Throughout the drawings, reference numeral 1 represents a carrier frame, 2 a field magnet created by permanent magnets, 3 an auxiliary iron core, 4 an iron reinforcement, 5 a vehicle support, 6 a support wheel, 7 a guide wheel, 8 a ground-side coil, 9 a guide plate, 10 a rail, 1$a$ a recess for receiving a permanent magnet, 1$b$ a recess for receiving an auxiliary iron core, 1$c$ a recess for receiving a tire shaft, 2$a$ an iron core, 2$b$ a permanent magnet and 6$a$ a tire shaft.

The carrier frame 1 forming part of the carrier of this invention, as shown in the front view of FIG. 5, is built up of an aluminium profiled material of a gate shape in section and, as shown in the side view of FIG. 4, is regularly provided with the recesses 1$a$ at given constant intervals, each receiving the permanent magnet 2$b$ that generates the permanent magnet-field magnet 2. As can be best seen from FIGS. 6 and 7, the field magnet 2 is created by the iron core 2$a$ and the permanent magnets 2$b$ defined by a set (pair) of N(north) and S(south) poles inserted into the recess 1$a$ in the carrier frame 1. As shown in FIGS. 1 and 2, adjacent iron cores 2$a$ are brought in close contact with each other and, although not illustrated, are interconnected with each other as by an iron sheet.

As can be best seen from FIG. 4, in the upper faces of both ends of the carrier frame 1 there are provided the recesses 1$b$, into which the auxiliary cores 3, each of a gate shape in section, are inserted, as shown in FIG. 1. Each auxiliary iron core 3 is provided with the guide wheels 7 at the ends of both its legs. While two sets of guide wheels 7, each on one side, are illustrated, it is understood that four sets of guide wheels 7, two on one side, may be used as well. Inwardly of each recess 1$b$ there is provided the recess 1$c$ for receiving the tire shaft 6a. The tire shaft 6a is fitted into the recess 1c transversely of the carrier frame with an auxiliary iron core of a gate shape in section, although not illustrated. On the both ends of the tire shaft 6a there are mounted the support wheels 6. Note that the iron reinforcements 4 that are L-shaped in section may be attached to the sides of the iron core 2a for reinforcing the support wheels 6 attached. However, if the carrier frame is tough enough, then these reinforcements 4 may be dispensed with.

In this manner, the tire shafts 6a are fixed by the iron reinforcements 4 and the carrier frame 1 built up of an aluminium profiled material of a gate shape in section. Then, the vehicle support 5 is mounted on the central upper face of the carrier frame 1.

Two carriers, each constructed above, are interconnected with each other for turning by means of a connector 13 and a damper made up of rubber or other elastomer material, so that one vehicle can be placed on the supports 5 thereon.

Figure 8A:
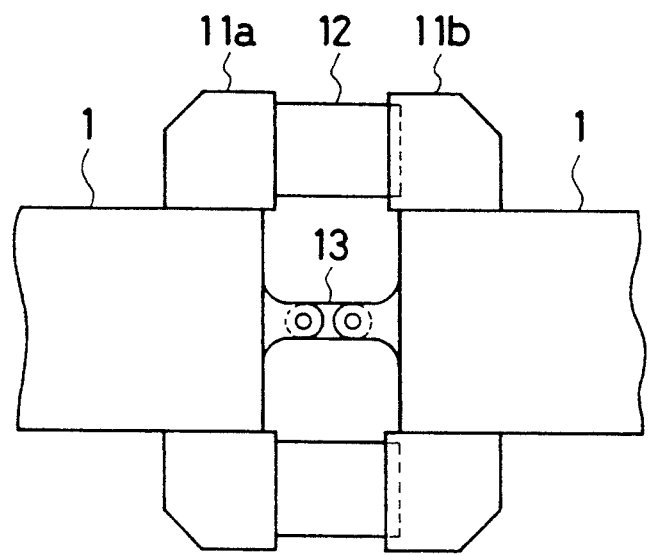
Figure 8B:
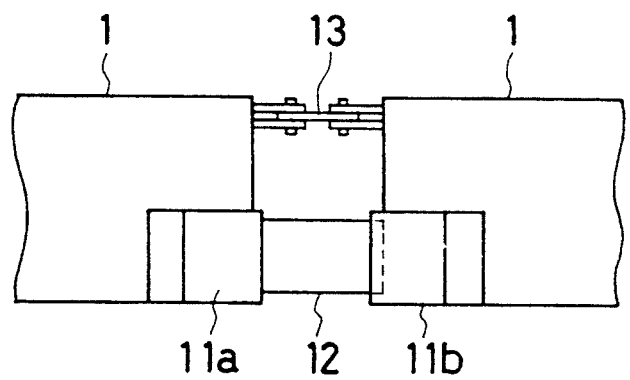

As can be best seen from FIGS. 8a and 8b that are plan and side views, respectively, the carriers 1 and 1 are interconnected with each other by means of the connector 13, and the ends of the carriers 1 and 1 facing each other are provided with dampers 11a and 11b. To be specific, one damper 11a includes a member 12 made of rubber or other elastomer and the other has a niche for receiving it. Thus, mutual angular variations of the carriers are allowed for by the connector 13 and absorbed by expansion and contraction of the elastomer 12, so that these carriers can be connected together with no gap between them.

According to the present invention described above, wherein the permanent magnet-field magnets, vehicle support and guide wheels and body support are mounted on the carrier frame made of an aluminium profiled material of a gate shape in section, it is possible to provide a carrier which is very simple in construction and light in weight and has the capability of generating large enough magnetic force. Vehicles are simply designed to be placed on the carriers, and so are larger in terms of the degree of freedom in changing their models, etc. than conventional integral vehicle/carrier structures.

While the invention has been particularly shown and described in reference to preferred embodiments thereof, it will be understood by those skilled in the art that changes in form and details may be made therein without departing from the spirit and scope of the invention.

What we claim is:

1. A carrier for linear motor vehicle-borne field magnets, comprising:

a carrier frame mounted beneath a vehicle support and having legs directed substantially downward from said vehicle support, said carrier further having field magnets respectively attached to said downwardly directed legs, wherein said carrier frame straddles over ground-side coils arranged along a track, and moves along adjacent permanent magnets located along the track in such a way that north and south poles of said field magnets are alternately opposite each other with said ground-side coils positioned therebetween for allowing currents flowing through said ground-side coils and said permanent magnets to interact so as to produce driving power, wherein said carrier frame is made of an aluminum-profiled material of a gate shape in section and has first legs with recesses at equal intervals, and wherein said recesses receive permanent magnet portions of said field magnets attached to iron core portions of said field magnets so that spatial magnetic fields can be produced by the alternation of the north and south poles between the first legs of the carrier frame of the aluminum-profiled material and of a gate shape in section.

2. The carrier as in claim 1, wherein the permanent magnet portions attached to the iron core portions are grouped with north and south pair as a unit, and wherein adjacent iron core portions are connected to each other in close contact relation.

3. The carrier as in claim 1, further comprising auxiliary iron cores having second legs, each of a gate shape in section, mounted at both ends of the carrier frame in such a way that said second legs straddle the carrier frame and are provided with guide wheels on both of said second legs.

4. The carrier as in claim 1, further comprising iron reinforcements mounted on the iron core portions to which the permanent magnet portions are attached, wherein auxiliary iron cores, each of a gate shape in section, are mounted such that said auxiliary iron cores straddle the iron reinforcements, and wherein said iron reinforcements include support wheels.

5. The carrier as in claim 1, wherein a plurality of said carrier frames are each provided with a vehicle support on a longitudinally central portion thereof so that at least one vehicle can be supported by vehicle supports of two adjacent frames.

* * * * *